United States Patent
Hwang et al.

(10) Patent No.: US 9,852,291 B2
(45) Date of Patent: Dec. 26, 2017

(54) COMPUTER SYSTEM AND SIGNATURE VERIFICATION SERVER

(71) Applicant: Ahnlab, Inc., Gyeonggi-do (KR)

(72) Inventors: Kyu Beom Hwang, Gyeonggi-do (KR); Jeong Hun Kim, Seoul (KR)

(73) Assignee: AHNLAB, INC., Gyeonggi-Do (KR)

( * ) Notice: Subject to any disclaimer, the term of this patent is extended or adjusted under 35 U.S.C. 154(b) by 0 days.

(21) Appl. No.: 14/380,142

(22) PCT Filed: Feb. 21, 2013

(86) PCT No.: PCT/KR2013/001355
§ 371 (c)(1),
(2) Date: Aug. 21, 2014

(87) PCT Pub. No.: WO2013/125866
PCT Pub. Date: Aug. 29, 2013

(65) Prior Publication Data
US 2015/0089641 A1    Mar. 26, 2015

(30) Foreign Application Priority Data

Feb. 21, 2012  (KR) .................. 10-2012-0017523

(51) Int. Cl.
*G06F 21/56*   (2013.01)
*H04L 29/06*   (2006.01)

(52) U.S. Cl.
CPC ............ *G06F 21/56* (2013.01); *G06F 21/561* (2013.01); *G06F 21/562* (2013.01);
(Continued)

(58) Field of Classification Search
CPC . H04L 63/1408; G06F 21/561; G06F 21/562; G06F 21/564; G06F 21/56; G06F 21/566; G06F 2221/034; G06F 2221/033
See application file for complete search history.

(56) References Cited

U.S. PATENT DOCUMENTS 7,231,637 B1 *  6/2007  McEwan ................. G06F 21/56
                                                   717/171
8,561,180 B1 * 10/2013  Nachenberg .......... G06F 21/562
                                                    726/22

(Continued)

*Primary Examiner* — Theodore C. Parsons
*Assistant Examiner* — Carlos M De Jesus Lassala
(74) *Attorney, Agent, or Firm* — Bacon & Thomas, PLLC (57) ABSTRACT

Disclosed are a computer system, a signature verification server, a method of supporting signature verification by a computer system, and a method of verifying signature. Embodiments of the present disclosure relates to a technology of misdiagnosis verification of signature used for a malicious code diagnosis, and more particularly to technologies which derive a result of performance of a malicious code diagnosis simulation on signature in a multi-user computer environment to use an actual client antivirus software and thus can overcome physical, spatial, and temporal limitations of conventional signature misdiagnosis verification by pre-distributing preliminary application signature in a state where misdiagnosis verification has not been completed to a plurality of user computers to reflect the preliminary application signature to a malicious code diagnosis on files stored in the plurality of user computers and performing misdiagnosis verification on the preliminary application signature based on information collected in connection with a result of the diagnosis.

23 Claims, 6 Drawing Sheets

(52) U.S. Cl.
CPC .......... *G06F 21/564* (2013.01); *G06F 21/566* (2013.01); *H04L 63/14* (2013.01); *G06F 2221/033* (2013.01); *G06F 2221/034* (2013.01); *H04L 63/1408* (2013.01)

(56) References Cited

U.S. PATENT DOCUMENTS

| | | | |
|---|---|---|---|
| 2008/0040804 A1* | 2/2008 | Oliver | G06F 21/564 726/25 |
| 2011/0126286 A1* | 5/2011 | Nazarov | G06F 21/564 726/24 |
| 2011/0173698 A1* | 7/2011 | Polyakov | G06F 11/0748 726/23 |
| 2012/0210423 A1* | 8/2012 | Friedrichs | H04L 63/1416 726/22 |

* cited by examiner

COMPUTER SYSTEM AND SIGNATURE VERIFICATION SERVER

BACKGROUND OF THE INVENTION

1. Field of the Invention

The present disclosure relates to a technology of misdiagnosis verification of a signature used for a malicious code diagnosis, and more particularly to technologies which derive a result of performance of a malicious code diagnosis simulation on a signature in a multi-user computer environment to use an actual client antivirus software and thus can overcome physical, spatial, and temporal limitations of conventional signature misdiagnosis verification by pre-distributing a preliminary application signature in a state where misdiagnosis verification has not been completed to a plurality of user computers to reflect the preliminary application signature to a malicious code diagnosis on files stored in the plurality of user computers and performing misdiagnosis verification on the preliminary application signature based on information collected in connection with a result of the diagnosis.

2. Description of the Prior Art

A method of diagnosing malicious code is largely divided into a diagnosis method using a signature and a diagnosis method using a code. While the diagnosis method using the code takes a lot of time and lacks speed, the diagnosis method using the signature can quickly respond. Accordingly, it is no exaggeration to say that 99% or more of malicious code diagnoses are performed using the signature.

A malicious code diagnosis method using such a signature generally uses one signature for several malicious codes, but diagnosis methods using a statistical technology diagnose scores to several thousands of malicious codes by using one signature.

In this case, a misdiagnosis rate caused by the diagnosis method using the signature may be low in terms of throughput but high in terms of frequency. Particularly, the diagnosis method using the signature has a misdiagnosis possibility in which the malicious code is misdiagnosed, that is, a normal file which is not the malicious code is diagnosed as the malicious code.

Accordingly, after the signature is made, a misdiagnosis verification process in which the signature is verified is performed. Most of existing companies that make the signature utilize a closed verification method (a verification method of performing verification in a closed laboratory) of gathering a plurality of white list files and testing/verifying the signature as the misdiagnosis verification process.

Such a closed verification method performs the misdiagnosis verification on only white list files, so that a white list quality problem may occur. Further, since it is difficult to indefinitely expand a storage capacity of the white list and it is impossible to collect and arrange all the files, it takes a lot of physical, spatial, and temporal costs and thus there is a limitation in the construction.

Accordingly, the present disclosure provides a broader verification method to overcome restrictions of the misdiagnosis verification method by the conventionally made signature.

SUMMARY OF THE INVENTION

Embodiments of the present disclosure relate to a technology of misdiagnosis verification of a signature used for a malicious code diagnosis, and more particularly to technologies which derive a result of performance of a malicious code diagnosis simulation on a signature in a multi-user computer environment to use an actual client antivirus software and thus can overcome physical, spatial, and temporal limitations of conventional signature misdiagnosis verification by pre-distributing a preliminary application signature in a state where misdiagnosis verification has not been completed to a plurality of user computers to reflect the preliminary application signature to a malicious code diagnosis on files stored in the plurality of user computers and performing misdiagnosis verification on the preliminary application signature based on information collected in connection with a result of the diagnosis.

In accordance with an aspect of the present disclosure, a computer system is provided. The computer system includes: a file storage unit configured to store one or more files; a malicious code diagnosis performer configured to perform a malicious code diagnosis on the one or more files by using a preliminary application signature in a state where misdiagnosis verification has not been completed; and a verification related information provider configured to, when a particular file is diagnosed as a malicious code as a result of the malicious code diagnosis using the preliminary application signature, provide verification related information required for the misdiagnosis verification based on a diagnosed result to a particular signature verification server.

In accordance with another aspect of the present disclosure, a signature verification server is provided. The signature verification server includes: a verification related information collector configured to collect, from one or more computer systems, verification related information according to a diagnosis result of a particular file diagnosed as the malicious code in accordance with a preliminary application signature in a state where misdiagnosis verification has not been completed; a verification performer configured to perform the misdiagnosis verification on the preliminary application signature based on the collected verification related information; and a verification result provider configured to provide a verification result of the misdiagnosis verification to the one or more computer systems having the preliminary application signature.

In accordance with another aspect of the present disclosure, a method of supporting signature verification by a computer system is provided. The method includes: storing one or more files; performing a malicious code diagnosis on the one or more files by using a preliminary application signature in a state where misdiagnosis verification has not been completed; and when a particular file is diagnosed as a malicious code as a result of the malicious code diagnosis using the preliminary application signature, providing verification related information required for the misdiagnosis verification based on a diagnosed result to a particular signature verification server.

In accordance with another aspect of the present disclosure, a method of verifying signature by a signature verification server is provided. The method includes: collecting, from one or more computer systems, verification related information according to a diagnosis result of a particular file diagnosed as malicious code according to preliminary application signature in a state where misdiagnosis verification has not been completed; performing the misdiagnosis verification on the preliminary application signature based on the collected verification related information; and providing a verification result of the misdiagnosis verification to the one or more computer systems having the preliminary application signature.

According to embodiments of the present disclosure, it is possible to derive a result of performance of a malicious code diagnosis simulation on a signature in a multi-user computer environment to use an actual client antivirus software and thus overcome physical, spatial, and temporal limitations of conventional signature misdiagnosis verification by pre-distributing a preliminary application signature in a state where misdiagnosis verification has not been completed to a plurality of user computers to reflect the preliminary application signature to a malicious code diagnosis on files stored in the plurality of user computers and performing misdiagnosis verification on the preliminary application signature based on information collected in connection with a result of the diagnosis.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

The present invention may have various modifications and embodiments and thus will be described with reference to specific embodiments in detail. However, it should be understood that the present disclosure is not limited to the specific embodiments, but the present disclosure includes all modifications, equivalents, and alternatives within the spirit and the scope of the present disclosure. When each of the accompanying drawings is described, the similar components are designated by the similar reference numerals.

In the case where a component is referred to as being "connected" or "accessed" to another component, it should be understood that not only the component is directly connected or accessed to the other component, but also, there may exist another component between them. Meanwhile, in the case where a component is referred to as being "directly connected" or "directly accessed" to other component, it should be understood that there is no component therebetween.

In the present disclosure, the terms are used to describe a specific embodiment, and are not intended to limit the present invention. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification Hereinafter, exemplary embodiments of the present disclosure will be described with reference to the accompanying drawings.

Figure 1:
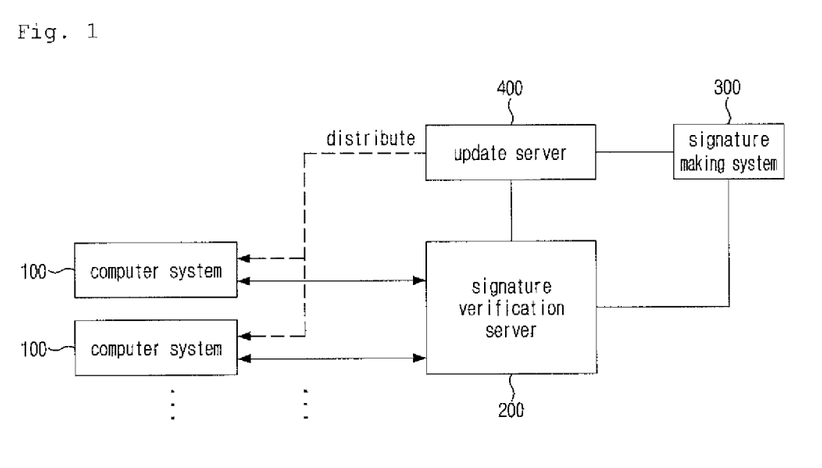
FIG. 1 illustrates a configuration of a signature verification system including a computer system and a signature verification server according to an exemplary embodiment of the present disclosure.

FIG. 1 illustrates a signature verification system according to an exemplary embodiment of the present disclosure.

As illustrated in FIG. 1, the signature verification system according to the present disclosure may include a plurality of computer systems 100, a signature verification server 200, a signature making system 300, and an update server 400.

The computer system 100 is a user computer belonging to various user places such as general home, companies, schools, educational institutes and the like, and stores/possesses a plurality of files and performs a malicious code diagnosis on the plurality of files through a client antivirus software to be described below.

The signature making system 300 is a system for making a signature used for the malicious code diagnosis. A method of making the signature may be one adopted from various conventional signature making methods, so a detailed description of the method of making the signature will be omitted.

Particularly, it is preferable that the signature making system 300 inserts an identifier indicating a state in which misdiagnosis verification has not been completed into newly made signature.

The update server 400 provides/distributes a signature made by the signature making system 300 to the computer system 100 which is a target to receive the signature to allow the signature to be updated in the client antivirus software of the computer system 100. As described above, a method in which the update server 400 updates the client antivirus software through the distribution of the signature to the computer system 100 may adopt one of the various existing methods, so a detailed description thereof will be omitted.

The computer system 100 may perform the malicious code diagnosis on a plurality of pre-stored files.

That is, when a malicious code diagnosis event is generated, the computer system 100 performs the malicious code diagnosis on a plurality of pre-stored files by using at least one of a preliminary application signature in a state where the misdiagnosis verification has not been completed and an application signature in a state where the misdiagnosis verification has been completed.

The application signature refers to a signature which can directly apply a diagnosis result to the malicious code diagnosis, that is, a signature in the state where the misdiagnosis verification has been completed and the preliminary signature refers to a signature which only reflects a diagnosis result on the malicious diagnosis but cannot directly apply the diagnosis result and uses the diagnosis result for a malicious code diagnosis simulation, that is, a signature in the state where the misdiagnosis verification has not been completed.

Accordingly, when a particular file is diagnosed as the malicious code according to the preliminary application signature as a result of the malicious code diagnosis, the computer system 100 may generate verification related information required for the misdiagnosis verification based on a diagnosis result of the particular file diagnosed as the malicious code and provide the generated verification related information to the signature verification server 200.

In other words, the reflection of the preliminary application signature on the malicious code diagnosis by the computer system 100 corresponds to the performance of the malicious code diagnosis simulation of the preliminary application signature on a plurality of files possessed by/stored in the computer system 100.

The signature verification server 200 may collect, from a plurality of computer systems 100, verification related information according to the diagnosis result of the particular file diagnosed as the malicious code in accordance with the preliminary application signature in the state where the misdiagnosis verification has not been completed.

In other words, the signature verification server 200 collects, from each of a plurality of computer systems 100, results of the performance of the malicious code diagnosis simulation of the preliminary application signature on a plurality of files possessed by/stored in each of the computer systems 100.

The above corresponds to a collection of results of the malicious code diagnosis simulation performed in a wide environment having no physical, spatial, and temporal restrictions if it is considered that types and numbers of files possessed by/stored in each of the plurality of computer systems 100 are various and limitless and malicious code diagnosis simulations of the preliminary application signature are simultaneously performed in the respective computer systems 100.

The signature verification server 200 performs the misdiagnosis verification on the preliminary application signature based on the collected verification related information as described above.

Further, the signature verification server 200 provides the verification result of the misdiagnosis verification to at least one computer system 100 having the preliminary application signature.

More specifically, when the diagnosis by the preliminary application signature is determined as the misdiagnosis as a result of the performance of the misdiagnosis verification on the preliminary application signature, the signature verification server 200 may provide an abnormal verification result of the preliminary application signature to the signature making system 400 and allow the signature making system 400 to re-make a signature corresponding to the preliminary application signature.

Further, the signature verification server 200 may provide the abnormal verification result of the preliminary application signature to at least one computer system 100 having the preliminary application signature and change a state of the preliminary application signature to an inactive state to make the preliminary application signature not applied to a later malicious code diagnosis.

Meanwhile, when the misdiagnosis determination is not made during a particular monitoring period as a result of the performance of the misdiagnosis verification on the preliminary application signature, the signature verification server 200 provides a normal verification result of the preliminary application signature to at least one computer system 100 having the preliminary application signature.

Then, when the computer system 100 receives the normal verification result from the signature verification server 200 in accordance with the provided verification related information, the computer system 100 changes a state of the corresponding preliminary application signature to an application signature state where the misdiagnosis verification has been completed.

Further, the signature verification server 200 may provide the normal verification result of the preliminary application signature to a signature management system (not shown, for example, the signature making system 400) and allow the signature management system to manage the preliminary application signature of which the state has been changed to the application signature state where the misdiagnosis verification has been completed.

Meanwhile, for example, a particular computer system 100 of a plurality of computer systems 100 may be a computer system which possesses/stores a white list file. In this case, when the particular file is diagnosed as the malicious code according to the preliminary application signature as a diagnosis result of the malicious code diagnosis performed on the white list file by the particular computer system 100, the signature verification server 200 may directly determine the diagnosis of the corresponding preliminary application signature as the misdiagnosis and provide an abnormal verification result to the particular computer system 100 and the signature making system 300.

Figure 2:
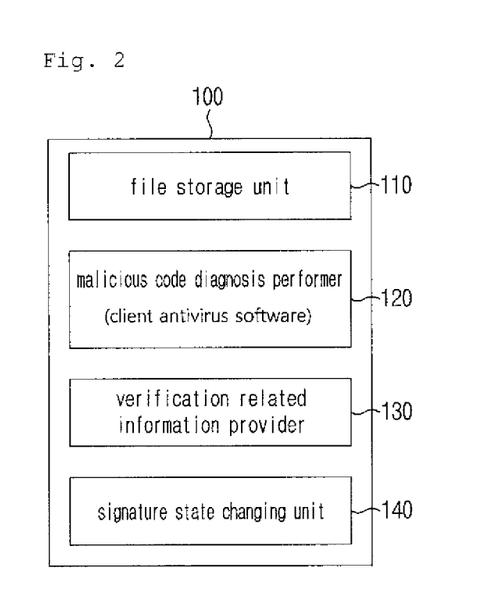
FIG. 2 is a block diagram illustrating a configuration of a computer system according to an exemplary embodiment of the present disclosure.

Hereinafter, the computer system according to the present disclosure will be described in more detail with reference to FIG. 2.

The computer system 100 according to the present disclosure includes a filter storage unit 110 configured to store one or more files, a malicious code diagnosis performer 120 configured to perform a malicious code diagnosis on the one or more files by using at least one of a preliminary application signature in a state where misdiagnosis verification has not been completed and an application signature in a state where the misdiagnosis verification has been completed, and a verification related information provider 130 configured to, when a particular file is diagnosed as the malicious code according to the preliminary application signature as a result of the performance of the malicious code diagnosis, generate verification related information required for the misdiagnosis verification based on a diagnosis result of the particular file diagnosed as the malicious file and provide the generated verification related information to a particular signature verification server 200.

Further, the computer system 100 according to the present disclosure may further include a signature state changing unit 140.

The file storage unit 110 possesses/stores one or more files on which the malicious code diagnosis to be described below will be performed.

The malicious code diagnosis performer 120 performs the malicious code diagnosis on one or more files of the file storage unit 110 by using at least one of the preliminary application signature in the state where the misdiagnosis verification has not been completed and the application signature in the state where the misdiagnosis verification has been completed.

The malicious code diagnosis performer 120 corresponds to the aforementioned client antivirus software.

That is, the malicious code diagnosis performer 120 receives a signature provided/distributed from the update server 400 and updates the signature to use it for the malicious code diagnosis.

Further, when a malicious code diagnosis, event is generated, the malicious code diagnosis performer 120 performs the malicious code diagnosis on one or more files of the file storage unit 110 by using at least one of the preliminary application signature in the state where the misdiagnosis verification has not been completed and the application signature in the state where the misdiagnosis verification has been completed.

Then, when a particular file is diagnosed as the malicious code according to the application signature as a result of the performance of the malicious code diagnosis, the malicious code diagnosis performer 120 directly applies the diagnosis result to perform a general diagnosis process such as curing the malicious code since the application signature is the signature in the state where the misdiagnosis verification has been completed.

When the particular file is diagnosed as the malicious code according to the preliminary application signature as a result of the performance of the malicious code diagnosis, the verification related information provider 130 may generate verification related information required for the misdiagnosis verification based on a diagnosis result of the particular file diagnosed as the malicious code and provide the generated verification related information to the particular signature verification server 200.

It is preferable that the verification related information includes at least one of signature identification information of the preliminary application signature, file identification information of the diagnosed particular file, information on places with which a diagnosis user corresponding to the computer system 100 is associated, file existence period information indicating a period for which the diagnosed particular file exists within the computer system 100, and malicious code diagnosis history information of the diagnosed particular file.

For example, when the particular file is diagnosed as the malicious file according to the preliminary application signature, the verification related information provider 130 generates verification related information including at least one of signature identification information of preliminary application signature used for the diagnosis, file identification information of the diagnosed particular file, information on places with which a diagnosis user corresponding to the computer system 100 is associated (for example, school), diagnosis time information indicating a time when the diagnosis is performed (for example, year/month/hour/minute/second), file existence period information indicating a period for which the diagnosed particular file exists within the computer system 100 (for example, 200 hours), and malicious code diagnosis history information indicating whether the diagnosed particular file has been diagnosed as the malicious code in the past.

In addition, the verification related information provider 130 provides the generated verification related information to the signature verification server 200.

As described above, the verification related information provider 130 may provide the signature verification server 200 with verification related information on at least one preliminary application signature diagnosed whenever the malicious code diagnosis performer 120 performs the malicious code diagnosis.

Then, as described above, the signature verification server 200 collects, from each of a plurality of computer systems 100, verification related information according to a diagnosis result of the particular file diagnosed as the malicious code in accordance with the preliminary application signature in the state where the misdiagnosis verification has not been completed and thus has a result same as the collection of the result of the performance of the malicious code diagnosis of the preliminary application signature on a plurality of files possessed by/stored in each of the computer systems 100.

When a verification result of the performance of the misdiagnosis verification on the preliminary application signature by the signature verification server based on the verification related information collected from the one or more computer systems is received and the received verification result is normal, the signature state changing unit 140 changes a state of the preliminary application signature to the application signature state in which the misdiagnosis verification has been completed.

More specifically, the signature state changing unit 140 may receive, from the signature verification server 200, the verification result of the preliminary application signature reflected when the malicious code diagnosis is performed by the malicious code diagnosis performer 120.

Then, when the received verification result is a normal verification result, the signature state changing unit 140 changes a state of the corresponding preliminary application signature to the application signature state where the misdiagnosis verification has been completed.

Meanwhile, when the received verification result is an abnormal verification result, the signature state changing unit 140 changes the state of the corresponding preliminary application signature to an inactive state. Then, the malicious code diagnosis performer 120 may not reflect the preliminary application signature in the inactive state on a later malicious code diagnosis and may remove a preliminary application signature in the inactive state.

Figure 3:
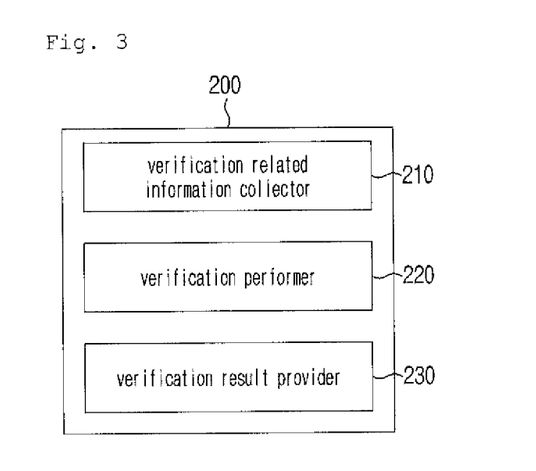
FIG. 3 is a block diagram illustrating a configuration of a signature verification server according to an exemplary embodiment of the present disclosure.

Hereinafter a configuration of the signature verification server according to the present disclosure will be described in detail with reference to FIG. 3.

The signature verification server 200 according to the present disclosure includes a verification related information collector 210 configured to collect, from one or more computer systems 100, verification related information according to a result of a particular file diagnosed as the malicious code based on preliminary application signature in a state where misdiagnosis verification has not been completed, a verification performer 220 configured to perform the misdiagnosis verification on the preliminary application signature based on the collected verification related information, and a verification result provider 230 configured to provide a verification result of the performance of the misdiagnosis verification to the one or more computer systems having the preliminary application signature.

The verification related information collector 210 collects, from one or more computer systems 100, verification related information according to the result of the particular file diagnosed as the malicious code based on the preliminary application signature in the state where the misdiagnosis verification has not been completed.

The above corresponds to that the verification related information collector 210 collects, from a plurality of computer systems 00, the verification related information diagnosed according to the preliminary application signature in the state where the misdiagnosis verification has not been completed, by the malicious code diagnosis performed on files having limitless types and numbers, that is, results of the malicious code diagnosis simulations.

Further, the verification performer 220 performs the misdiagnosis verification on the preliminary application signature based on the verification related information collected by the verification related information collector 210.

That is, the verification related information collector 210 performs the misdiagnosis verification on the corresponding preliminary application signature based on the verification related information corresponding to the preliminary application signature which has been collected by the malicious code diagnosis performed on files having almost limitless types and numbers from a plurality of computer systems 100.

More specifically, according to a first embodiment, the verification performer 220 may perform the misdiagnosis verification based on the verification related information collected from a plurality of computer systems 100. When a first condition in which a number of diagnoses of a particular file by the corresponding preliminary application signature is equal to or larger than a particular number, a second condition in which the particular file is detected to not have malicious code for a particular reference time or longer, and a third condition in which the particular file exists in the computer system 100 for a particular existence period or longer are satisfied, the verification performer 220 may determine the diagnosis by the corresponding preliminary application signature as the misdiagnosis.

In other words, when it is determined that, through the misdiagnosis verification, the particular file has been diagnosed by the preliminary application signature by a particular number of times or more, the malicious code has not been detected from the particular file for a particular reference time, and the particular file has existed for a particular existence period or longer, the verification performer 220 may determine the diagnosis by the corresponding preliminary application signature as the misdiagnosis.

At this time, in the above case, the diagnosis by the corresponding preliminary application signature may be determined to have a high misdiagnosis possibility instead being determined as the misdiagnosis. When a JO number of times by which the diagnosis is determined to have the high misdiagnosis possibility corresponds to a particular number (for example, three) or more, the verification performer 220 may determine the diagnosis by the corresponding preliminary application signature as the misdiagnosis.

Alternatively, according to a second embodiment, when the verification performer 220 performs the misdiagnosis verification based on the verification related information collected from a plurality of computer systems 100 and a fourth condition in which a number of diagnoses generated by the corresponding preliminary application signature in a particular place associated with the diagnosis user is a particular intensive generation number or more for a particular intensive generation time is satisfied, the verification performer 220 may determine the diagnosis by the corresponding preliminary application signature as the misdiagnosis.

In other words, when it is determined that, through the misdiagnosis verification, the diagnoses generated by the corresponding preliminary application signature for a short time (particular intensive generation time) in a particular place associated with the diagnosis user (for example, school) are intensively generated, the verification performer 220 may determine the diagnosis by the corresponding preliminary application signature as the misdiagnosis.

At this time, in the above case, the diagnosis by the corresponding preliminary application signature may be determined to have a high misdiagnosis possibility instead being determined as the misdiagnosis. When a number of times by which the diagnosis is determined to have the high misdiagnosis possibility corresponds to a particular number (for example, three) or more, the verification performer 220 may determine the diagnosis by the corresponding preliminary application signature as the misdiagnosis.

Alternatively, according to a third embodiment, when the verification performer 220 performs the misdiagnosis verification based on verification related information collected from a plurality of computer systems 100 and distributes a corresponding preliminary application signature, and then at least one of a fifth condition in which diagnoses generated by the corresponding preliminary application signature are generated by a particular number of times or more within a particular distribution initial time and a sixth condition in which a feature matching rate between files diagnosed within the particular distribution initial time is equal to or smaller than a particular matching reference is satisfied, the verification performer 220 may determine the diagnosis by the corresponding preliminary signature as the misdiagnosis.

In other words, when the number of diagnoses generated by the corresponding preliminary application signature at an initial time when the corresponding preliminary application signature is distributed (within the particular distribution initial time) corresponds to a particular generation number or more and a feature (for example, code size) matching rate between files diagnosed by the corresponding preliminary application signature is determined as a particular matching reference or smaller such that they are considerably different from each other, the verification performer 220 may determine the diagnosis by the corresponding preliminary application signature as the misdiagnosis.

At this time, in the above case, the diagnosis by the corresponding preliminary application signature may be determined to have a high misdiagnosis possibility instead being determined as the misdiagnosis. When a number of times by which the diagnosis is determined to have the high misdiagnosis possibility corresponds to a particular number (for example, three) or more, the verification performer 220 may determine the diagnosis by the corresponding preliminary application signature as the misdiagnosis.

As described above, the verification performer 220 may perform the misdiagnosis verification by adopting each of the first, second, and third embodiments or a combination or thereof.

Meanwhile, when it is determined that the diagnosis by the preliminary application signature is the misdiagnosis as described above, the verification performer 220 may report misdiagnosis determination basis information (for example, diagnosed file identification information, file size, misdiagnosis determination state and the like) for the preliminary application signature diagnosed as the misdiagnosis to an analyzer and allow the analyzer to finally determine whether the diagnosis is the misdiagnosis by the preliminary application signature with reference to the report.

The verification result provider 230 provides verification results of the misdiagnosis verification performed by the verification performer 220 to one or more computer systems 100 having the preliminary application signature.

More specifically, when the diagnosis by the preliminary application signature is determined as the misdiagnosis as a result of the misdiagnosis verification by the verification performer 220, the verification result provider 230 may provide an abnormal verification result of the preliminary application signature to a particular signature making system 300 and allow the signature making system 400 to re-make a signature corresponding to the preliminary application signature.

That is, when the diagnosis by the preliminary application signature is determined as the misdiagnosis as a result of the misdiagnosis verification of the preliminary application signature by the verification performer 220, the verification result provider 230 may provide an abnormal verification result of the preliminary application signature to the signature making system 400 and allow the signature making system 400 to re-make a signature corresponding to the preliminary application signature.

Further, the verification result provider 230 may provide the abnormal verification result of the preliminary application signature to one or more computer systems 100 having the preliminary application signature and changes a state of the preliminary application signature to an inactive state to make the preliminary application signature not applied to the malicious code diagnosis.

Meanwhile, when the misdiagnosis determination is not made during a particular monitoring period as a result of the misdiagnosis verification of the preliminary application signature by the verification performer 220, the verification result provider 230 provides a normal verification result of the preliminary application signature to one or more computer systems 100 having the preliminary application signature.

Then, the computer system 100 changes a state of the corresponding preliminary application signature to the signature state where the misdiagnosis verification has been completed as described above.

Further, the verification result provider 230 may provide the normal verification result of the preliminary application signature to a signature management system (not shown, for example, the signature making system 400) and change the state of the preliminary application signature to the application signature state where the misdiagnosis verification has been completed.

According to the computer system and the signature verification service according to the present disclosure as described above, the preliminary application signature in the state where the misdiagnosis verification has not been completed is pre-distributed to a plurality of user computers and thus the preliminary application signature is reflected when the malicious code diagnosis is performed on a file stored in the plurality of user computers, and the misdiagnosis verification is performed on the preliminary application signature based on information collected in connection with a result of the diagnosis, so that a result of the performance of the malicious code diagnosis simulation on the signature in a multi-user computer environment to use an actual client antivirus software can be derived, thereby overcoming physical, spatial, and temporal limitations of the conventional signature misdiagnosis verification.

Figure 4:
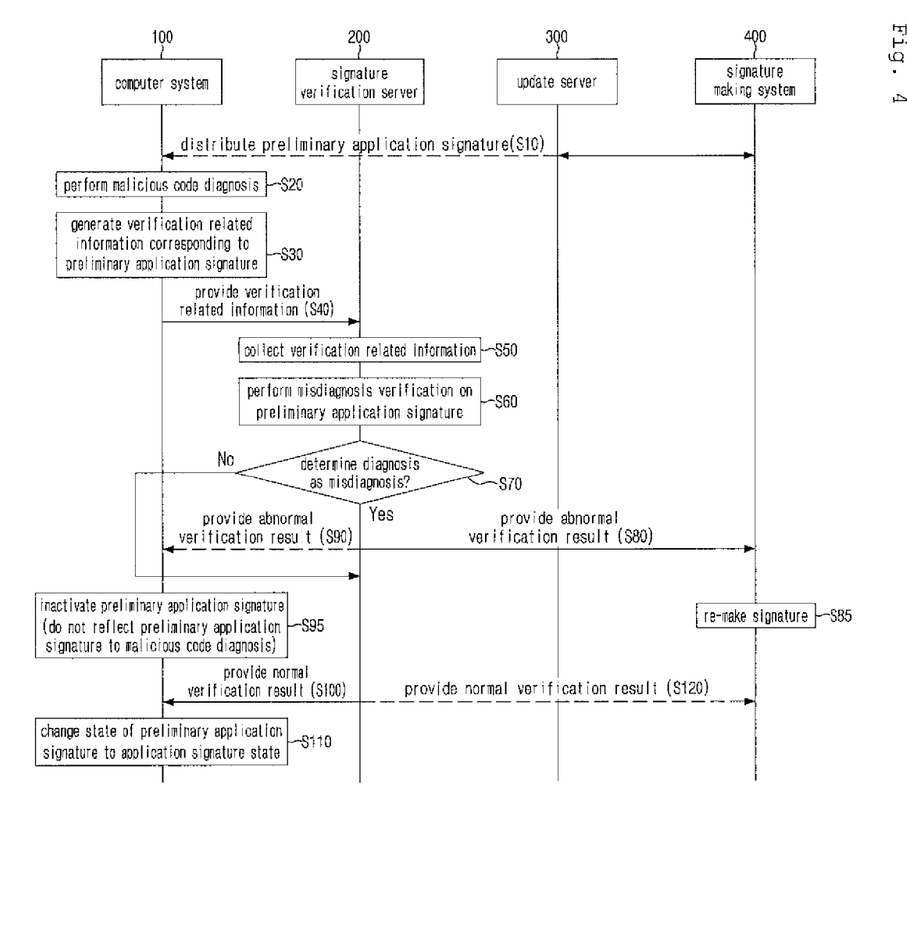
FIG. 4 is a flowchart illustrating a control flow of a signature verification system according to an exemplary embodiment of the present disclosure.
Figure 5:
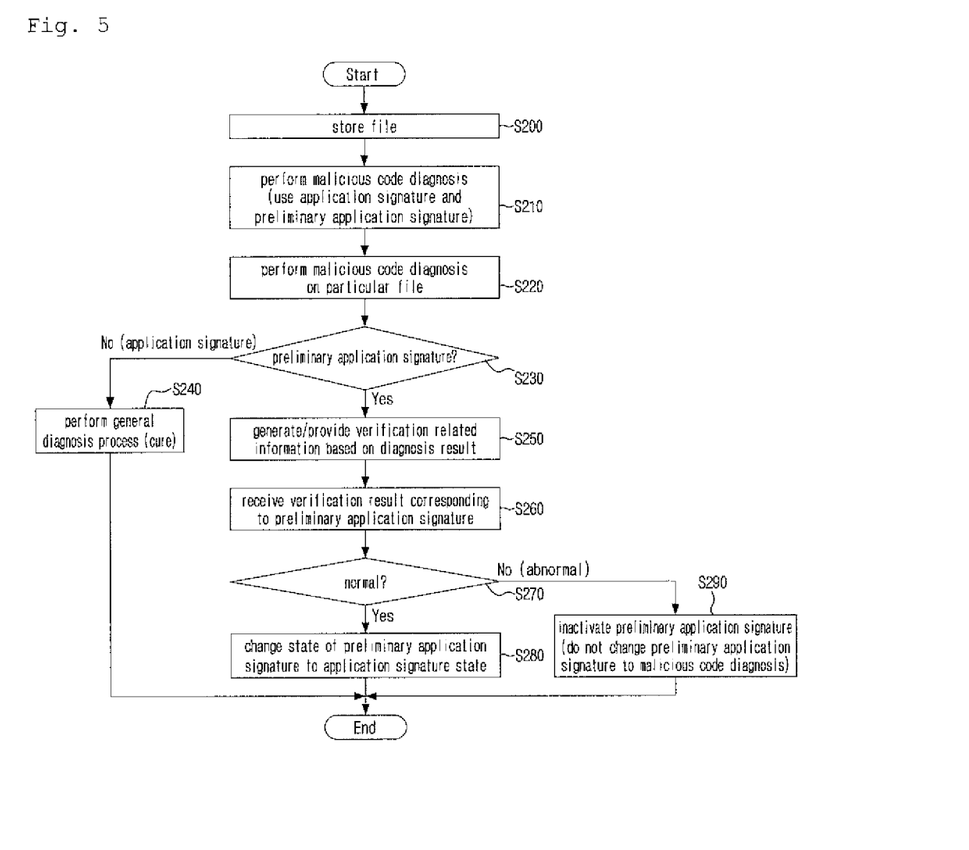
FIG. 5 is a flowchart illustrating an operation flow of a method of supporting signature verification by a computer system according to an exemplary embodiment of the present disclosure.
Figure 6:
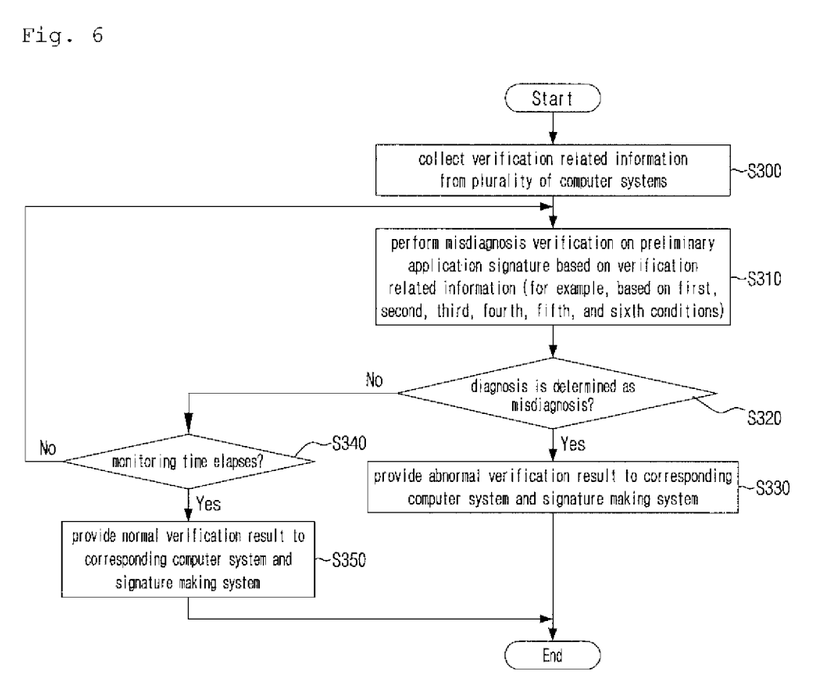
FIG. 6 is a flowchart illustrating an operation flow of a signature verification method according to an exemplary embodiment of the present disclosure.

Hereinafter, a signature verification method according to the present disclosure will be described with reference to FIGS. 4 to 6. Here, reference numerals of the configurations illustrated in FIGS. 1 to 3 will be referred to in order to describe configurations of FIG. 4 for convenience of the description.

A control flow of a signature verification system according to an exemplary embodiment of the present disclosure will be first described with reference to FIG. 4.

A plurality of computer systems 100 receive a signature (including a preliminary signature) distributed/provided from an update server 400 in step S10 and updates a client antivirus software.

When a malicious code diagnosis event is generated, the computer system 100 performs the malicious code diagnosis on a plurality of pre-stored files by using at least one of a preliminary application signature in a state where the misdiagnosis verification has not been completed and an application signature in a state where the misdiagnosis verification has been completed in step S20.

When a particular file is diagnosed as the malicious code according to the preliminary application signature as a result of the malicious code diagnosis, the computer system 100 may generate verification related information required for the misdiagnosis verification based on the result of the particular file diagnosed as the malicious code in step S30 and provide the generated verification related information to the signature verification server 200 in step S40.

Then, the signature verification server 200 may collect, from a plurality of computer systems 100, verification related information according to the result of the particular file diagnosed as the malicious code based on the preliminary application signature in the state where the misdiagnosis verification has not been completed in step S50.

The signature verification server 200 performs the misdiagnosis verification on the preliminary application signature based on the collected verification related information described above in step S60.

Further, the signature verification server 200 provides verification results of the misdiagnosis verification to at least one computer system 100 having the preliminary application signature.

More specifically, when the diagnosis by the preliminary application signature is determined as the misdiagnosis as a result of the misdiagnosis verification of the preliminary application signature in step S70, the signature verification server 200 may provide an abnormal verification result of the preliminary application signature to the signature making system 400 and allow the signature making system 400 to re-make a signature corresponding to the preliminary application signature in step S85.

Further, the signature verification server 200 may provide the abnormal verification result of the preliminary application signature to at least one computer system 100 having the preliminary application signature in step S90 and changes a state of the preliminary application signature to an inactive state to make the preliminary application signature not applied to the malicious code diagnosis in step S95.

Meanwhile, when the misdiagnosis determination is not made during a particular monitoring period as a result of the misdiagnosis verification of the preliminary application signature, the signature verification server 200 provides a normal verification result of the preliminary application signature to at least one computer system 100 having the preliminary application signature in step S100.

Then, when the computer system 100 receives the normal verification result from the signature verification server 200 according to the provided verification related information, the computer system 100 changes a state of the corresponding preliminary application signature to an application signature state where the misdiagnosis verification has been completed in step S110.

Further, the signature verification server 200 may provide the normal verification result of the preliminary application signature to a signature management system (not shown, for example, the signature making system 400) in step S120 and change the state of the preliminary application signature to an application signature state where the misdiagnosis verification has been completed.

Hereinafter, a method of supporting signature verification by a computer system according to an exemplary embodiment of the present disclosure will be described with reference to FIG. 5.

The method of supporting the signature verification by the computer system according to the present disclosure possesses/stores at least one file subject to the malicious code diagnosis described below in step S200.

The method of supporting the signature verification by the computer system performs the malicious code diagnosis on at least one file by using at least one of a preliminary application signature in a state where the misdiagnosis verification has not been completed and an application signature in a state where the misdiagnosis verification has been completed in step S210.

When the malicious code of a particular file is diagnosed as a result of the performance of the malicious code diagnosis, the method of supporting the signature verification by the computer system according to the present disclosure determines whether the signature used for the diagnosis is the application signature or the preliminary application signature in step S230.

When the particular file is diagnosed as the malicious code according to the application signature as a result of the malicious code diagnosis, the method of supporting the signature verification by the computer system according to the present disclosure immediately applies the diagnosis result to perform a general diagnosis process such as curing the malicious code since the application signature is the signature in the state where the misdiagnosis verification has been completed in step S240.

Meanwhile, when the particular file is diagnosed as the malicious code according to the preliminary application signature as a result of the malicious code diagnosis, the method of supporting the signature verification by the computer system according to the present disclosure may generate verification related information required for the misdiagnosis verification based on the result of the particular file diagnosed as the malicious code and provide the generated verification related information to the particular signature verification server 200 in step S250.

Further, the method of supporting the signature verification by the computer system according to the present disclosure may receive a verification result of the preliminary application signature reflected in the malicious code diagnosis of step S210 from the signature verification server 200 in step S260.

Then, the method of supporting the signature verification by the computer system according to the present disclosure determines whether the received verification result is a normal verification result or an abnormal verification result in step S270. When the received verification result is the normal verification result, the method of supporting the signature verification by the computer system according to the present disclosure changes a state of the corresponding preliminary application signature to the application signature state where the misdiagnosis verification has been completed in step S280.

Meanwhile, when the received verification result is the abnormal verification result, the method of supporting the signature verification by the computer system according to the present disclosure changes the state of the corresponding preliminary application signature to an inactive state in step S290. Then, the method of supporting the signature verification by the computer system according to the present disclosure may not reflect the preliminary application signature in the inactive state when the malicious code diagnosis is performed later and may remove preliminary application signature in the inactive state.

Hereinafter, a signature verification method according to an exemplary embodiment of the present disclosure will be described with reference to FIG. 6.

The signature verification method according to the present disclosure collects, from one or more computer systems 100, verification related information according to a result of a particular file diagnosed as the malicious code based on the preliminary application signature in the state where the misdiagnosis verification has not been completed in step S300.

The above corresponds to that the signature verification method according to the present disclosure collects, from a plurality of computer systems 100, verification related information diagnosed according to the preliminary application signature in the state where the misdiagnosis verification has been completed, by the malicious code diagnosis performed on a file having limitless types and numbers, that is, results of malicious code diagnosis simulations.

Further, in step S310, the signature verification method according to the present disclosure performs the misdiagnosis verification on the preliminary application signature based on verification related information collected in step S300.

That is, the signature verification method according to the present disclosure performs the misdiagnosis verification on the corresponding preliminary application signature based on the verification related information corresponding to the preliminary application signature which has been collected by the malicious code diagnosis performed on files having almost limitless types and numbers from a plurality of computer systems 100.

Here, a process of performing the misdiagnosis verification in the signature verification method according to the present disclosure corresponds to the first, second, and third embodiments of the verification performer 220 described with reference to FIG. 3, so a detailed description thereof will be omitted.

Further, the signature verification method according to the present disclosure provides a verification result of the misdiagnosis verification performed in step S310 to at least one computer system 100 having the corresponding preliminary application signature.

More specifically, when the diagnosis by the preliminary application signature is determined as the misdiagnosis as a result of the misdiagnosis verification of the preliminary application signature in step S320, the signature verification method according to the present disclosure may provide an abnormal verification result of the preliminary application signature to the signature making system 400 in step S330 and allow the signature making system 400 to re-make a signature corresponding to the preliminary application signature.

Further, the signature verification method according to the present disclosure may provide the abnormal verification result of the preliminary application signature to at least one computer system 100 having the preliminary application signature in step S330 and changes a state of the preliminary application signature to an inactive state to make the preliminary application signature not applied to the malicious code diagnosis.

Meanwhile, when the misdiagnosis determination is not generated as the result of the misdiagnosis verification of the preliminary application signature and a particular monitoring period elapses in step S340, the signature verification method according to the present disclosure provides a normal verification result of the preliminary application signature to the at least one computer system 100 having the preliminary application signature in step S350.

Then, the computer system 100 changes a state of the corresponding preliminary application signature to the signature state where the misdiagnosis verification has been completed as described above.

Further, the signature verification method according to the present disclosure may provide the normal verification result of the preliminary application signature to a signature management system (not shown, for example, the signature making system 400) in step S350 and change the state of the preliminary application signature to an application signature state where the misdiagnosis verification has been completed.

According to the computer system and the signature verification service according to the present disclosure as described above, the preliminary application signature in the state where the misdiagnosis verification has not been completed is pre-distributed to a plurality of user computers and thus the preliminary application signature is reflected when the malicious code diagnosis is performed on a file stored in the plurality of user computers, and the misdiagnosis verification is performed on the preliminary application signature based on information collected in connection with a result of the diagnosis, so that a result of the performance of the malicious code diagnosis simulation on the signature in a multi-user computer environment to use an actual client antivirus software can be derived, thereby overcoming physical, spatial, and temporal limitations of the conventional signature misdiagnosis verification.

A method of executing a security document and a method of managing a document by a terminal device according to an embodiment of the present disclosure may be implemented in the form of program command executable through various computer means to be recorded in a computer-readable medium. The computer-readable medium may include a program command, a data file, and a data structure individually or a combination thereof. The program command recorded in the medium is specially designed and configured for the present invention, but may be used after being known to those skilled in computer software fields. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware devices may be configured to operate as one or more software modules to perform the operations of the present invention, and vice versa.

As described above, although the present invention has been described through the specific matters such as detailed elements, the limited embodiments, and the drawings, they are provided to help overall comprehension of the present invention, and the present invention is not limited to the above-described embodiments. It is obvious to those skilled in the art to which the present invention pertains that various changes and modifications can be made from such descriptions as described above.

Accordingly, the spirit and scope of the present invention should not be limited or determined by the above-described embodiments, and it should be noted that not only the claims which will be described below but also their equivalents fall within the spirit and scope of the present invention.

What is claimed is:

1. A computer system connected to a signature verification server and configured to execute client antivirus software and perform a malicious code diagnosis without a completed signature verification on one or more files stored in the computer system, the signature verification server being configured to carry out a misdiagnosis verification and provide a verification result to the computer system, the computer system comprising: a file storage unit configured to store the one or more files; a malicious code diagnosis performer configured to perform the malicious code diagnosis on the one or more files by using a preliminary application signature in a state where misdiagnosis verification has not been completed; and a verification related information provider configured to, when a particular file is diagnosed as a malicious code as a result of the malicious code diagnosis using the preliminary application signature, provide verification related information required for the misdiagnosis verification based on a diagnosed result to the signature verification server, wherein the verification related information includes at least one of information on places with which a diagnosis user corresponding to the computer system is associated and diagnosis time information, and wherein a verification performer of the signature verification server determines the malicious code diagnosis by the preliminary application signature as a misdiagnosis when at least one of a first condition in which a collected number of diagnoses of the particular file by the preliminary application signature is equal to or larger than a particular number, a second condition in which the malicious code has not been detected from the particular file for a particular reference time or longer, and a third condition in which the particular file exists in the computer system for a particular existence period or longer is satisfied based on the verification related information provided by the verification related information provider.

2. The computer system of claim 1, further comprising a signature state changing unit configured to, when a verification result of the misdiagnosis verification performed on the preliminary application signature based on the verification related information collected from the one or more computer systems is received from the signature verification server and the received verification result is normal, change a state of the preliminary application signature to an application signature state in which the misdiagnosis verification has been completed.

3. A signature verification server connected to one or more computer systems, each of the one or more computer systems configured to execute client antivirus software, the client antivirus software using the signature verification server to respectively perform misdiagnosis verification on one or more files stored in the one or more computer systems, comprising: a verification related information collector configured to collect, from the one or more computer systems, verification related information according to a diagnosis result of a particular file diagnosed as malicious code in accordance with a preliminary application signature in a state where misdiagnosis verification has not been completed; a verification performer configured to perform the misdiagnosis verification on the preliminary application signature based on the collected verification related information; and a verification result provider configured to provide a verification result of the misdiagnosis verification to the one or more computer systems having the preliminary application signature, wherein the verification related information includes at least one of information on places with which a diagnosis user corresponding to the computer system is associated and diagnosis time information, and wherein the verification performer determines the malicious code diagnosis by the preliminary application signature as a misdiagnosis when at least one of a first condition in which a collected number of diagnoses of the particular file by the preliminary application signature is equal to or larger than a particular number, a second condition in which the malicious code has not been detected from the particular file for a particular reference time or longer, and a third condition in which the particular file exists in the computer system for a particular existence period or longer is satisfied based on the verification related information collected from the one or more computer systems.

4. The signature verification server of claim 3, wherein the verification performer determines the malicious code diagnosis by the preliminary application signature as a misdiagnosis when a fourth condition, in which the collected number of diagnoses generated by the preliminary application signature in a particular diagnosis user place for a particular intensive generation time is a particular intensive generation number or more, is satisfied based on the verification related information collected from the one or more computer systems.

5. The signature verification server of claim 3, wherein the verification performer determines the malicious code diagnosis by the preliminary application signature as a misdiagnosis when at least one of a fifth condition, in which the collected number of diagnoses generated by the preliminary application signature within a particular distribution initial time after the distribution of the preliminary application signature to the one or more computer systems is a particular generation number or more, and a sixth condition, in which a feature matching rate between files diagnosed by the preliminary application signature within the particular distribution initial time is equal to or smaller than a particular matching reference, is satisfied based on the verification related information collected from the one or more computer systems.

6. The signature verification server of one of claims 3, 4, and 5, wherein, when the diagnosis by the preliminary application signature is determined as the misdiagnosis as a result of the misdiagnosis verification performed by the verification performer, the verification result provider provides an abnormal verification result of the preliminary application signature to a particular signature making system and allows the particular signature making system to re-make a signature corresponding to the preliminary application signature.

7. The signature verification server of one of claims 3, 4, and 5, wherein, when the misdiagnosis determination is not made for a particular monitoring period as a result of the misdiagnosis verification of the preliminary application signature performed by the verification performer, the verification result provider provides a normal verification result of the preliminary application signature to the one or more computer systems having the preliminary application signature.

8. A method of supporting signature verification by a computer system connected to a signature verification server and configured to execute client antivirus software and perform a malicious code diagnosis without a completed signature verification on one or more files stored in the computer system, the signature verification server being configured to carry out a misdiagnosis verification and provide a verification result to the computer system, the method comprising: storing the one or more files in a storage unit of the computer system; performing the malicious code diagnosis on the one or more files by using a preliminary application signature in a state where misdiagnosis verification has not been completed; and when a particular file is diagnosed as a malicious code as a result of the malicious code diagnosis using the preliminary application signature, providing verification related information required for the misdiagnosis verification based on a diagnosed result to the signature verification server, wherein the verification related information includes at least one of information on places with which a diagnosis user corresponding to the computer system is associated and diagnosis time information, and wherein the performing of the misdiagnosis verification by the signature verification server comprises determining the malicious code diagnosis by the preliminary application signature as a misdiagnosis when at least one of a first condition in which a collected number of diagnoses of the particular file by the preliminary application signature is equal to or larger than a particular number, a second condition in which the malicious code has not been detected from the particular file for a particular reference time or longer, and a third condition in which the particular file exists in the computer system for a particular existence period or longer is satisfied based on the verification related information.

9. The method of claim 8, further comprising, when a verification result of the misdiagnosis verification performed on the preliminary application signature based on the verification related information collected from the one or more computer systems is received from the signature verification server and the received verification result is normal, changing a state of the preliminary application signature to an application signature state in which the misdiagnosis verification has been completed.

10. The method of claim 8, wherein the verification related information further includes at least one of signature identification information of the preliminary application signature, file identification information of the diagnosed particular file, file existence period information indicating a time for which the diagnosed particular file exists within the computer system, and malicious code diagnosis history information of the diagnosed particular file.

11. A method of verifying signature by a signature verification server, the method comprising: collecting, from one or more computer systems, verification related information according to a diagnosis result of a particular file diagnosed as malicious code according to preliminary application signature in a state where misdiagnosis verification has not been completed; performing the misdiagnosis verification on the preliminary application signature based on the collected verification related information; and providing a verification result of the misdiagnosis verification to the one or more computer systems having the preliminary application signature, wherein the verification related information includes at least one of information on places with which a diagnosis user corresponding to the computer system is associated and diagnosis time information, and wherein the performing of the misdiagnosis verification comprises determining the malicious code diagnosis by the preliminary application signature as a misdiagnosis when at least one of a first condition in which a collected number of diagnoses of the particular file by the preliminary application signature is equal to or larger than a particular number, a second condition in which the malicious code has not been detected from the particular file for a particular reference time or longer, and a third condition in which the particular file exists in the computer system for a particular existence period or longer is satisfied based on the verification related information collected from the one or more computer systems.

12. The method of claim 11, wherein the verification related information includes at least one of signature identification information of the preliminary application signature, file identification information of the diagnosed particular file, file existence period information indicating a time for which the diagnosed particular file exists within the computer system, and malicious code diagnosis history information of the diagnosed particular file.

13. The method of claim 12, wherein the performing of the misdiagnosis verification comprises determining the malicious code diagnosis by the preliminary application signature as a misdiagnosis when a fourth condition, in which the collected number of diagnoses generated by the preliminary application signature in a particular diagnosis user place for a particular intensive generation time is a particular intensive generation number or more, is satisfied based on the verification related information collected from the one or more computer systems.

14. The method of claim 12, wherein the performing of the misdiagnosis verification comprises determining the malicious code diagnosis by the preliminary application signature as a misdiagnosis when at least one of a fifth condition, in which the collected number of diagnoses generated by the preliminary application signature within a particular distribution initial time after the distribution of the preliminary application signature to the one or more computer systems is a particular generation number or more, and a sixth condition, in which a feature matching rate between files diagnosed by the preliminary application signature within the particular distribution initial time is equal to or smaller than a particular matching reference, is satisfied based on the verification related information collected from the one or more computer systems.

15. The method of one of claims 13 and 14, further comprising, when the malicious code diagnosis by the preliminary application signature is determined as the misdiagnosis as a result of the misdiagnosis verification in the performing of the misdiagnosis verification, providing an abnormal verification result of the preliminary application signature to a particular signature making system and allowing the particular signature making system to re-make a signature corresponding to the preliminary application signature.

16. The method of one of claims 13 and 14, wherein the providing of the verification result comprises, when the misdiagnosis determination is not made for a particular monitoring period as a result of the misdiagnosis verification of the preliminary application signature in the performing of the misdiagnosis verification, providing a normal verification result of the preliminary application signature to the one or more computer systems having the preliminary application signature.

17. A non-transitory computer-readable recording medium recording a program including instructions for performing, by a computer system connected to a signature verification server and configured to execute client antivirus software and perform a malicious code diagnosis without a completed signature verification on one or more files stored in the computer system, the signature verification server being configured to carry out a misdiagnosis verification and provide a verification result to the computer system, the steps of: storing the one or more files in a storage unit of the computer system; performing the malicious code diagnosis on the one or more files by using a preliminary application signature in a state where misdiagnosis verification has not been completed; and when a particular file is diagnosed as a malicious code as a result of the malicious code diagnosis using the preliminary application signature, providing verification related information required for the misdiagnosis verification based on a diagnosed result to the signature verification server, wherein the verification related information includes at least one of information on places with which a diagnosis user corresponding to the computer system is associated and diagnosis time information, and wherein the performing of the misdiagnosis verification by the signature verification server comprises determining the malicious code diagnosis by the preliminary application signature as a misdiagnosis when at least one of a first condition in which a collected number of diagnoses of the particular file by the preliminary application signature is equal to or larger than a particular number, a second condition in which the malicious code has not been detected from the particular file for a particular reference time or longer, and a third condition in which the particular file exists in the computer system for a particular existence period or longer is satisfied based on the verification related information.

18. The non-transitory computer-readable recording medium of claim 17, wherein the program further includes instructions for performing, when a verification result of the misdiagnosis verification performed on the preliminary application signature based on the verification related information collected from the one or more computer systems is received from the signature verification server and the received verification result is normal, changing a state of the preliminary application signature to an application signature state in which the misdiagnosis verification has been completed.

19. The non-transitory computer-readable recording medium of claim 17, wherein the verification related information further includes at least one of signature identification information of the preliminary application signature, file identification information of the diagnosed particular file, file existence period information indicating a time for which the diagnosed particular file exists within the computer system, and malicious code diagnosis history information of the diagnosed particular file.

20. A non-transitory computer-readable recording medium recording a program including instructions for performing, by a computer system connected to a signature verification server and configured to execute client antivirus software and perform a malicious code diagnosis without a completed signature verification on one or more files stored in the computer system, the signature verification server being configured to carry out a misdiagnosis verification and provide a verification result to the computer system, the steps of: collecting, from one or more computer systems, verification related information according to a diagnosis result of a particular file diagnosed as malicious code according to preliminary application signature in a state where misdiagnosis verification has not been completed; performing the misdiagnosis verification on the preliminary application signature based on the collected verification related information; and providing a verification result of the misdiagnosis verification to the one or more computer systems having the preliminary application signature, wherein the verification related information includes at least one of information on places with which a diagnosis user corresponding to the computer system is associated and diagnosis time information, and wherein the performing of the misdiagnosis verification comprises determining the malicious diagnosis by the preliminary application signature as a misdiagnosis when at least one of a first condition in which a collected number of diagnoses of the particular file by the preliminary application signature is equal to or larger than a particular number, a second condition in which the malicious code has not been detected from the particular file for a particular reference time or longer, and a third condition in which the particular file exists in the computer system for a particular existence period or longer is satisfied based on the verification related information collected from the one or more computer systems.

21. The non-transitory computer-readable recording medium of claim 20, wherein the verification related information includes at least one of signature identification information of the preliminary application signature, file identification information of the diagnosed particular file, file existence period information indicating a time for which the diagnosed particular file exists within the computer system, and malicious code diagnosis history information of the diagnosed particular file.

22. The non-transitory computer-readable recording medium of claim 20, wherein the performing of the misdiagnosis verification comprises determining the malicious diagnosis by the preliminary application signature as a misdiagnosis when a fourth condition, in which the collected number of diagnoses generated by the preliminary application signature in a particular diagnosis user place for a particular intensive generation time is a particular intensive generation number or more, is satisfied based on the verification related information collected from the one or more computer systems.

23. The non-transitory computer-readable recording medium of claim 20, wherein the performing of the misdiagnosis verification comprises determining the malicious code diagnosis by the preliminary application signature as a misdiagnosis when at least one of a fifth condition, in which the collected a number of diagnoses generated by the preliminary application signature within a particular distribution initial time after the distribution of the preliminary application signature to the one or more computer systems is a particular generation number or more, and a sixth condition, in which a feature matching rate between files diagnosed by the preliminary application signature within the particular distribution initial time is equal to or smaller than a particular matching reference, is satisfied based on the verification related information collected from the one or more computer systems.

* * * * *